May 9, 1961 P. G. McKINLEY 2,983,292
CLAMP TABLE FOR FABRICATING A ROOF TRUSS
Filed Jan. 20, 1959 7 Sheets-Sheet 4
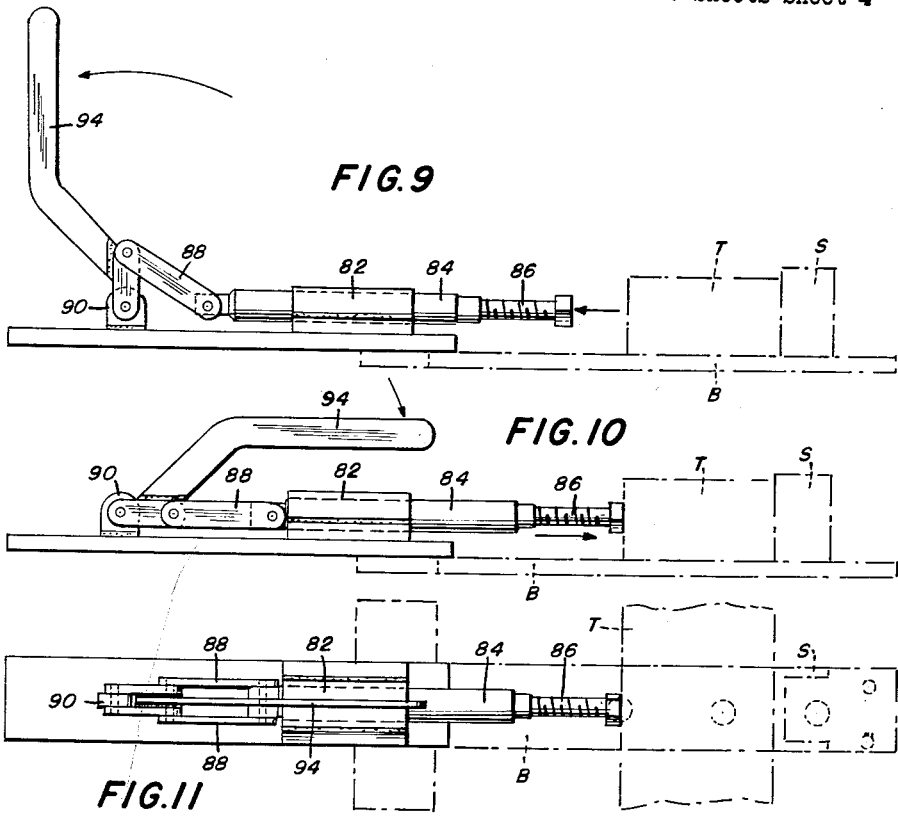
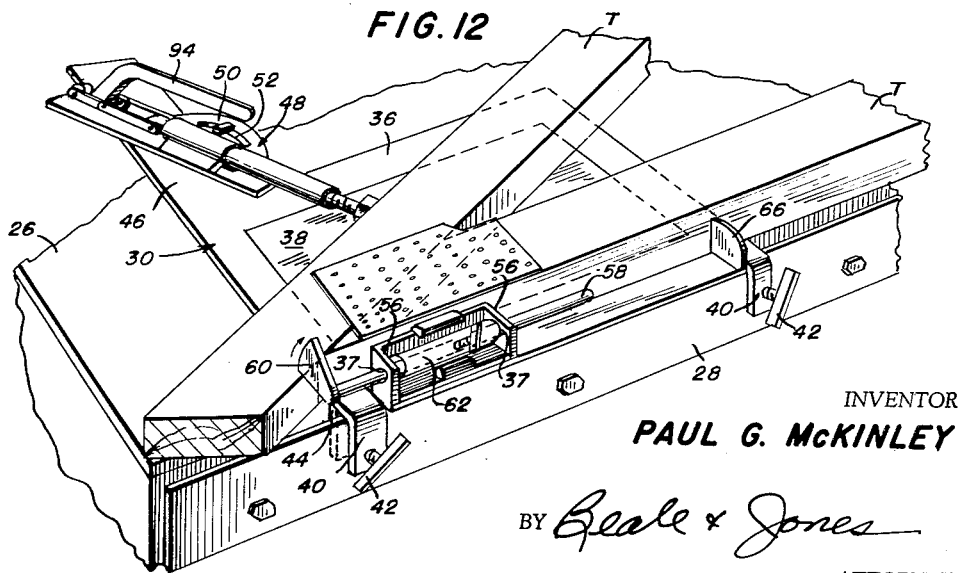
INVENTOR
PAUL G. McKINLEY
BY Beale & Jones
ATTORNEYS May 9, 1961 P. G. McKINLEY 2,983,292
CLAMP TABLE FOR FABRICATING A ROOF TRUSS
Filed Jan. 20, 1959 7 Sheets-Sheet 5
FIG. 13
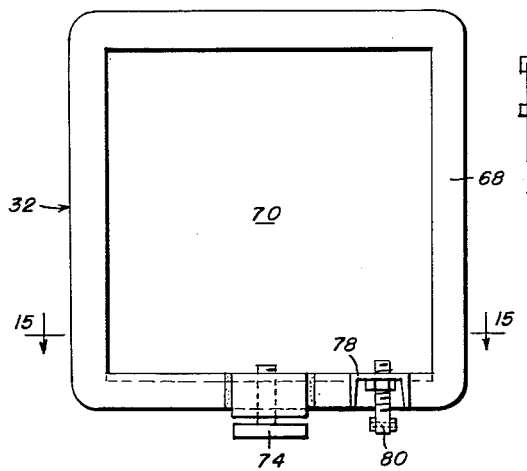
FIG. 14
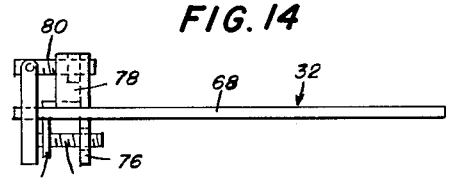
FIG. 15
FIG. 16
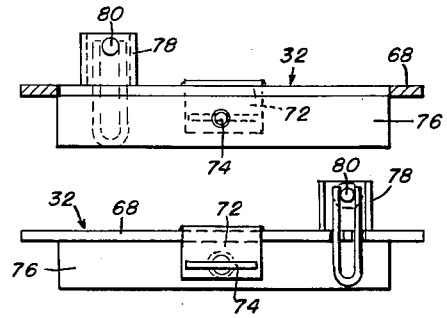
FIG. 17
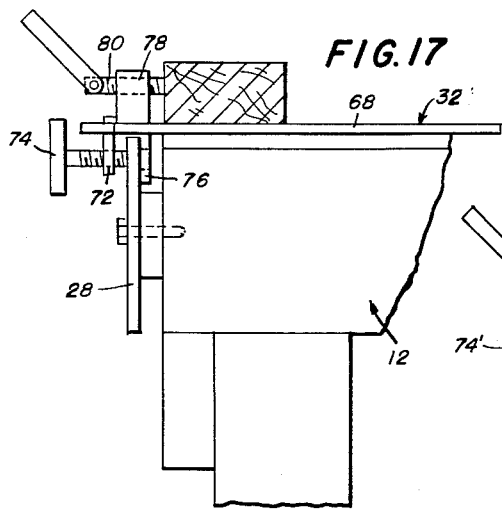
FIG. 18
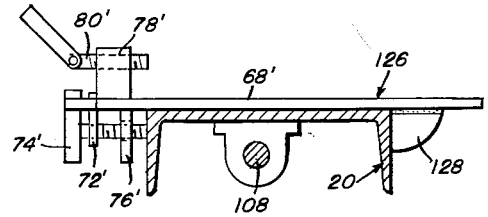
INVENTOR
PAUL G. McKINLEY
BY Beale & Jones
ATTORNEYS May 9, 1961 P. G. McKINLEY 2,983,292
CLAMP TABLE FOR FABRICATING A ROOF TRUSS
Filed Jan. 20, 1959 7 Sheets-Sheet 6
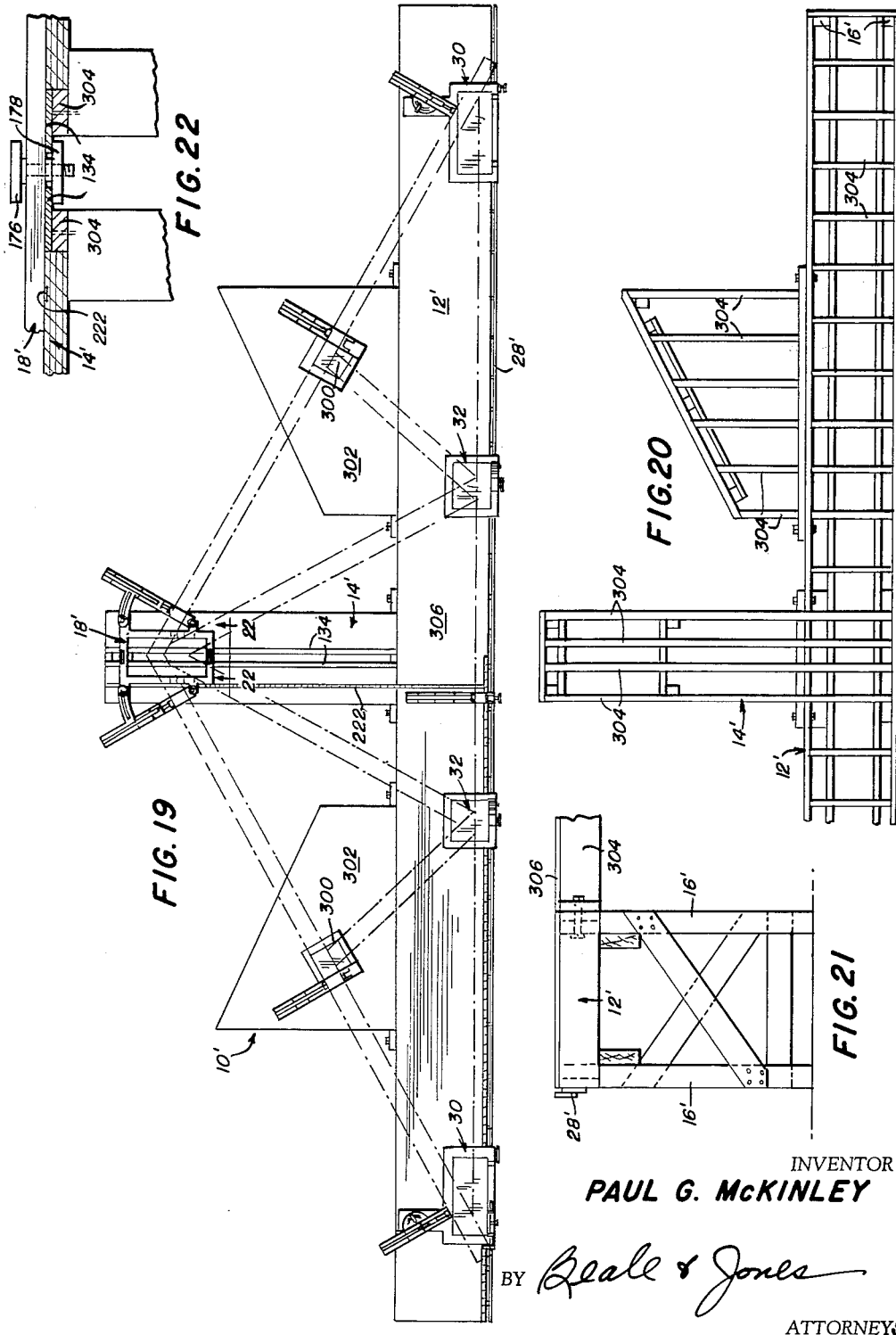
INVENTOR
PAUL G. McKINLEY
BY Beale & Jones
ATTORNEYS United States Patent Office 2,983,292
Patented May 9, 1961

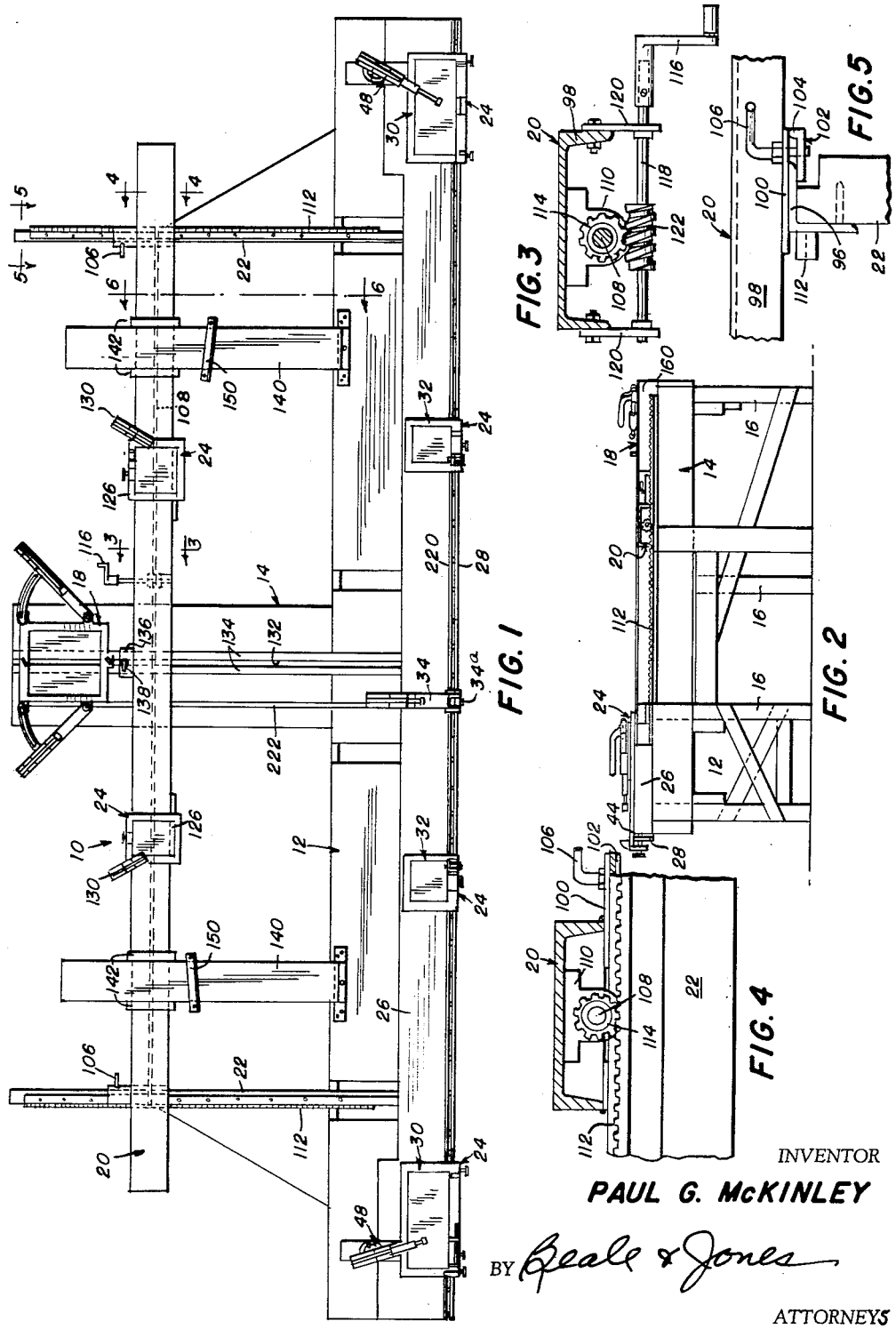

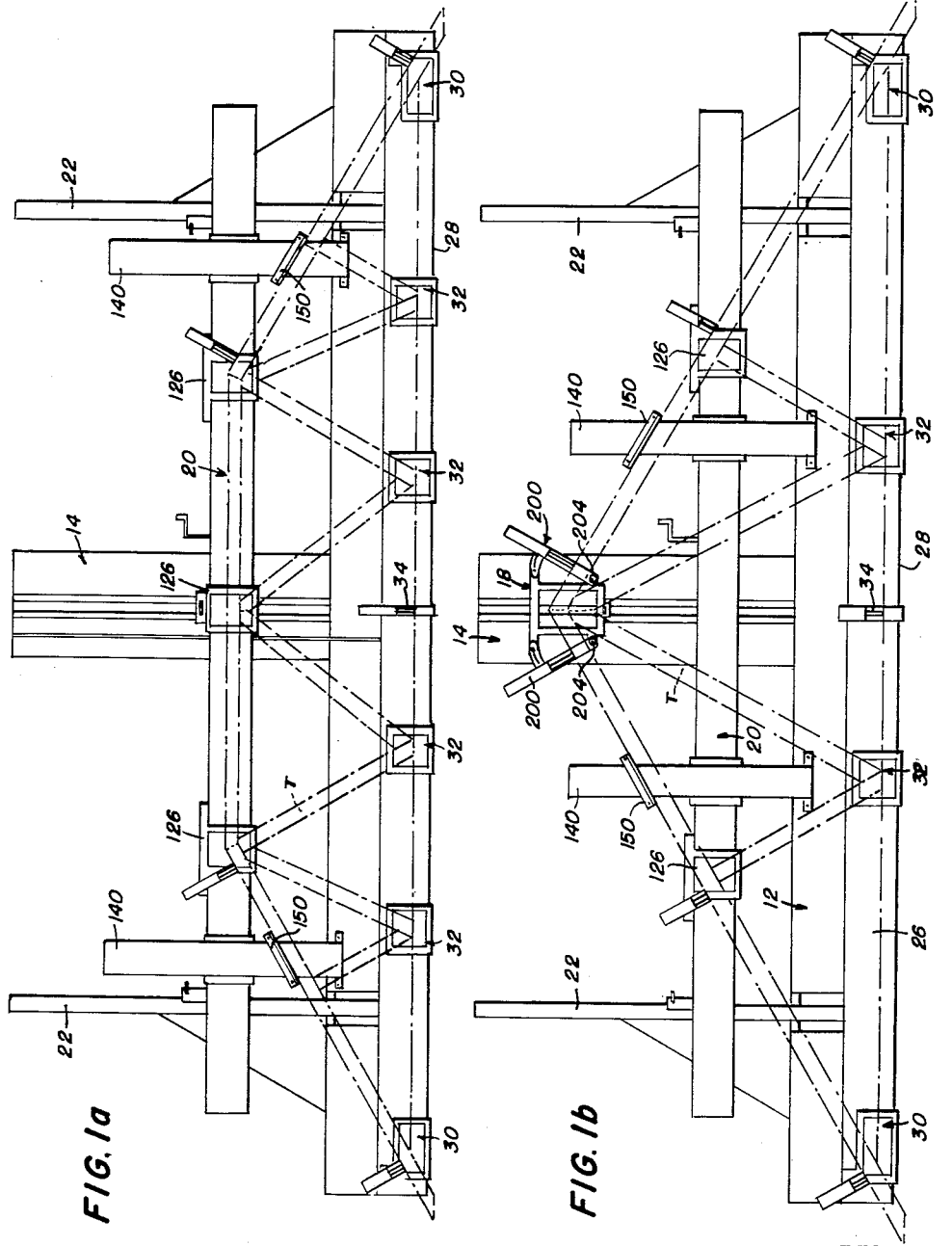

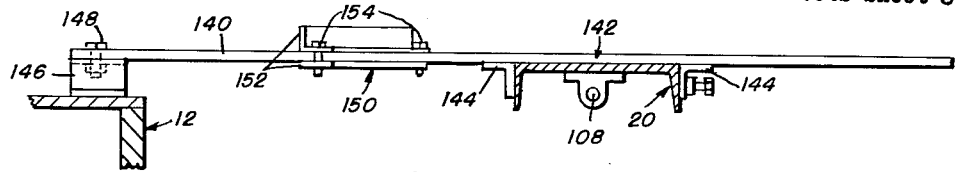
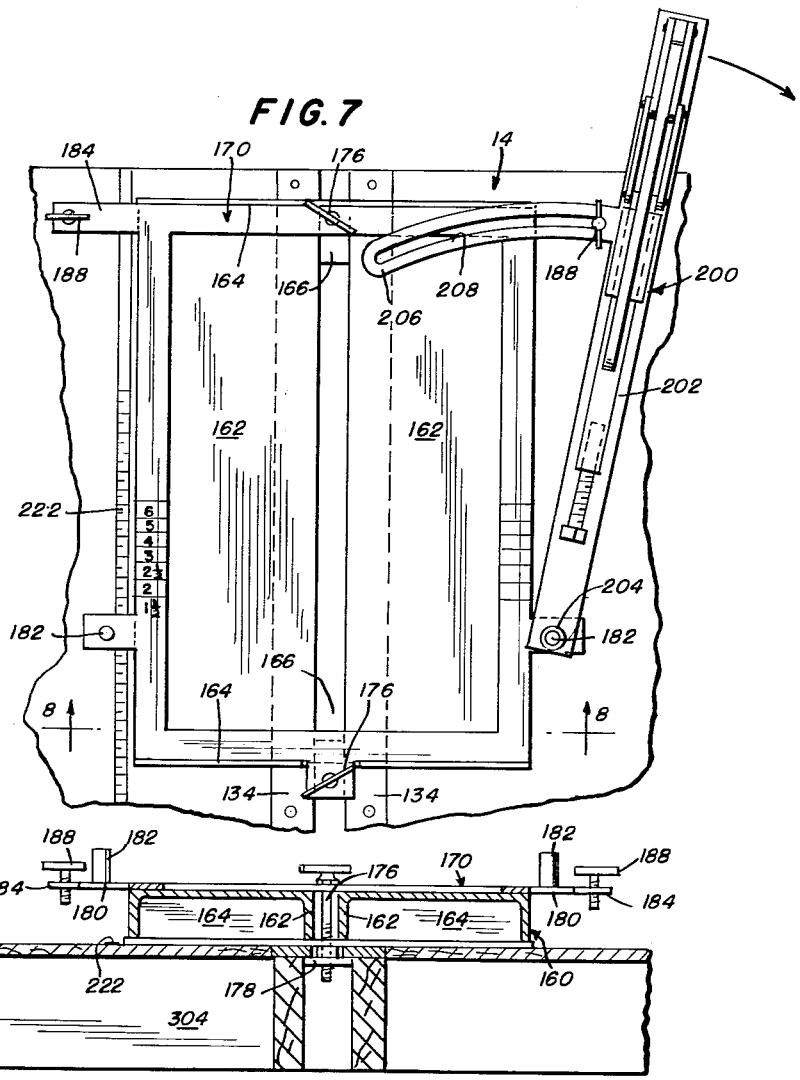

2,983,292

CLAMP TABLE FOR FABRICATING A ROOF TRUSS

Paul G. McKinley, Coral Gables, Fla., assignor to Pagebar, Inc., Miami, Fla., a corporation of Florida Filed Jan. 20, 1959, Ser. No. 787,840

3 Claims. (Cl. 144—288)

This invention relates to a clamp table for holding, during assembly, the parts of a coplanar roof truss. More specifically, this invention relates to a table supporting adjustably positionable nailing plates and clamping assemblies for making a wooden roof truss.

While this clamp table is especially adapted for making a truss having its members connected by couplings as described in my currently pending application Serial No. 726,896, filed April 7, 1958, it is not so limited, but is useful in forming a coplanar roof truss employing at the joints thereof couplings of any type. It should be understood that the nailing plates of the clamp table of my invention are provided to make the table adapted for use in fabricating trusses using my coupling.

In fabricating a coplanar roof truss; i.e., a roof truss in which the lower and upper chord members as well as the web members all lie in a single plane—it is possible to proceed without the aid of any means whatever to hold the various parts in position. However, it has been found that this produces sloppy, unworkmanlike structures which are non-uniform, one from the last. Hence, it is desirable to have a solid holding and support means for the various members during the assembly process.

It is an object of my invention to provide a clamp table having nailing plate and clamping assemblies adjustably positioned thereon to hold the various truss members during the truss fabrication.

It is a further object of my invention to provide in such a clamp table novel support means for the nailing plate and clamping assemblies whereby the assemblies can be moved to appropriate positions for fabrication of either a peak roof or a hip roof truss.

It is still a further object of this invention to provide for fabricating trusses an adjustable clamp table in which ample access is available to the workman closely adjacent the joint areas so that no matter what the shape or dimension of the truss he may efficiently and comfortably perform his work.

It is a further object of this invention to provide in a clamp table for producing a peak roof or a hip roof truss measuring means by which nailing plate and clamping assemblies can be suitably positioned for a truss of known dimension.

This invention embodies other novel features, details of construction and arrangement of parts which are hereinafter set forth in the specification and the claims and illustrated in the accompanying drawings, wherein:

Fig. 1 is a top plan view of a preferred embodiment of the invention;

Fig. 1a is a simplified top plan view showing a preferred embodiment of the invention set up to form a hip roof truss;

Fig. 1b is a simplified top plan view of a preferred embodiment of the invention set up to form a triangular roof truss;

Fig. 2 is a side elevation view of a preferred embodiment of the invention;

Fig. 3 is an enlarged fragmentary sectional view taken on the line 3—3 of Fig. 1;

Fig. 4 is an enlarged fragmentary sectional view taken on the line 4—4 of Fig. 1;

Fig. 5 is an enlarged fragmentary sectional view taken on the line 5—5 of Fig. 1;

Fig. 6 is an enlarged fragmentary sectional view taken on the line 6—6 of Fig. 1;

Fig. 7 is an enlarged fragmentary top plan view of the peak nailing plate and clamping assembly. The nailing plate and one of the clamping units have been removed for simplification;

Fig. 8 is a fragmentary sectional view taken on the line 8—8 of Fig. 7;

Fig. 9 is an enlarged side elevation of a typical toggle clamp unit in the disengaged disposition;

Fig. 10 is a side elevational view of a typical toggle clamp unit in the engaged disposition.

Fig. 11 is a top plan view of a typical toggle clamp unit in the engaged disposition;

Fig. 12 is an enlarged fragmentary perspective of a heel joint nailing plate and clamping assembly of the invention engaging a heel joint;

Fig. 13 is an enlarged top plan view of an intermediate nailing plate assembly;

Fig. 14 is a side elevational view of an intermediate nailing plate assembly;

Fig. 15 is a rear elevational view of an intermediate nailing plate assembly;

Fig. 16 is a front elevational view of an intermediate nailing plate assembly;

Fig. 17 is a fragmentary side elevational view showing the engagement of the nailing plate assembly with the runner rail of the clamp table;

Fig. 18 is an enlarged sectional view showing the engagement of a nailing plate assembly with the hip chord carriage;

Fig. 19 is a simplified top plan view of a modification of the clamp table of the invention adapted for making a triangular peak roof truss;

Fig. 20 is a fragmentary top plan view of a modification of the invention shown in Fig. 19 with the supporting surface removed to show a detail of the table support construction;

Fig. 21 is a slightly enlarged fragmentary side elevational view of the modification of the invention shown in Fig. 19;

Fig. 22 is an enlarged fragmentary sectional view taken on the line 22—22 of Fig. 19;

Figure 23:
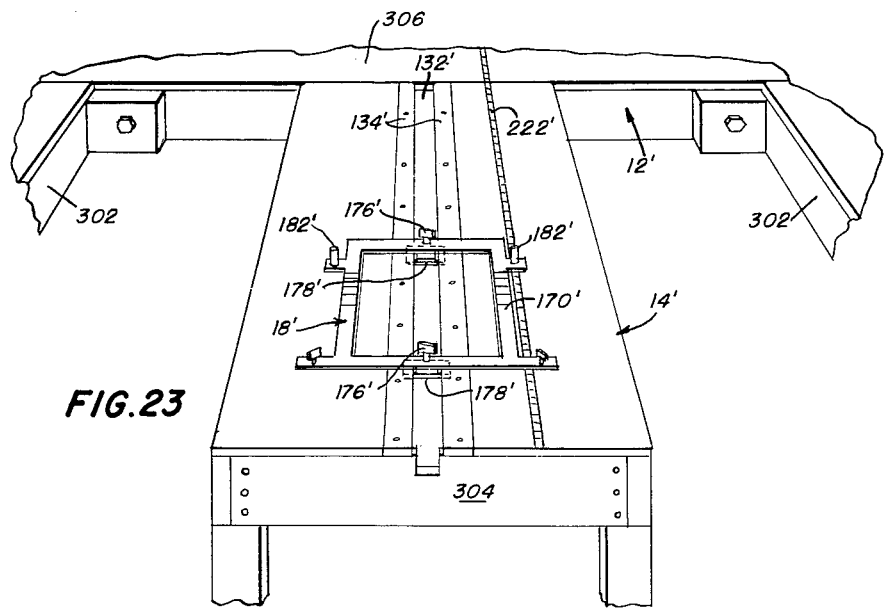
Fig. 23 is a fragmentary perspective view of the peak joint nailing plate and clamping assembly frame only supported in position of the offshoot portion of the modified form of the invention.

Briefly, the invention is a clamp table holding, during assembly, the parts of a coplanar roof truss including a lower chord member and a plurality of upper chord and web members. The table comprises a plurality of flat coplanar supporting surfaces or nailing plates adapted to support the roof truss parts at least at the joints thereof. It also includes a plurality of clamp members adapted to engage and exert pressures on the various roof truss parts to hold them firmly in position during assembly. Both the nailing plates and the clamp members are adjustably positionable laterally to permit use of the table with coplanar roof trusses of various pitches and dimensions.

Referring more specifically to the drawings, a preferred embodiment of the clamp table of the invention is shown in Fig. 1 and generally designated 10. Basically it comprises an elongated bench 12 having a lateral perpendicular offshoot 14 or arm extending rearward from the middle thereof. Both the elongated portion and the perpendicular offshoot are supported by a plurality of sturdy legs 16 appropriately cross braced as shown in Fig. 2. Adjustable lengthwise of the perpendicular offshoot is a peak joint clamp 18 and support. Similarly adjustable and in parallel disposition to the elongated portion of the bench is a hip chord carriage 20 riding on arms 22 supported from the floor. Resting on and adjustably secured to both the elongated bench 12 and the hip chord carriage 20 are a number of nailing plates and clamping assemblies generally designated 24. These may be adjusted as desired to hold, during assembly, the members of a truss of any dimensions.

More in detail, secured to the top surface of the elongated bench 12 along the front side thereof is a lower chord stationary support platform 26. The support platform has spaced outwardly from its front a coextensive runner rail 28. Resting on the support platform 26 adjacent the opposite ends thereof are heel joint nailing plate and clamping assemblies 30. To hold it firmly in position, each of the assemblies 30 has depending stabilizing means engaging the runner rail. Positioned intermediate the heel joint nailing plate and clamping assemblies 30 are the intermediate or lower chord-web panel joint nailing plate assemblies 32. These are also clamped to the runner rail 28. Similarly adjustable along the runner rail and resting on the stationary platform 26 may be a lower chord central clamping assembly 34 having camber adjustment means 34a.

Fig. 12 shows a typical heel joint nailing plate and clamping assembly 30. It preferably comprises an open rectangular frame 36 receiving a thick nailing plate 38 adapted to serve as backing means in clinching nails. The frame has along its front edge depending fingers 40 which fit over the outside of the runner 28 and are drilled centrally and tapped to receive wing bolts 42. Reference to Fig. 2 shows that spaced slightly inward of the plate and depending parallel to the fingers are the backing thumbs 44. The fingers and thumbs straddle the runner rail 28 and the wing bolts 42 abut the outside of the runner rail, clamping the rail against the thumbs 44. This stabilizes the position of the nailing plate and clamping assembly.

Extending rearwardly from the open rectangular frame is an arm 46 to which is pivoted a toggle clamp unit 48. The position of the pivotal clamp with respect to the arm 46 may be fixed by a wing bolt 50 screwed into a threaded opening in the arm and extending through an arcuate slot 52 in an enlarged portion of the clamp base.

As shown in Fig. 12 one of the heel joint nailing plate and clamping assemblies 30 includes a stop means for positioning the lower chord member of a truss suitably with respect to the heel joint and, for that matter, the entire table. Secured to the front of the frame 36, the stop means comprises a pair of upwardly extending spaced plates 56 having apertures 37 in horizontal alignment therein. Fitting loosely through these apertures is a shaft 58 which carries on the leftward end thereof as shown in Fig. 12 a cam-shaped stop 60 normally extending rearward to provide an abutment member for the left end of the lower chord. An adjusting sleeve 62 larger than the aperture 37 is adjustably secured over the shaft 58 between the spaced plates 56, its position thereon being adjustably fixed by means of a wing bolt as shown. The stop 60 normally extends rearward so that a lower chord member may be slid to abut it. This, by pre-accomplished setting of the assembly 30 and of the sleeve 62 on the shaft 58 correctly positions the lower chord member. Subsequently, when the upper chord member is brought into position, it strikes the distal end of the stop 60, camming it up out of the way.

The plates 56 and the upwardly extending ear 66 constitute the forward abutment members against which the unit clamp 48 works.

A typical intermediate or panel point nailing plate assembly 32 is shown in Fig. 13 to comprise an open rectangular frame 68 receiving within it a thickened nailing plate 70. Extending down perpendicularly from the front edge of the frame is a finger 72 centrally drilled and tapped and receiving a wing bolt 74. Behind the finger 72 is a parallel elongated thumb 76 having an enlarged aperture therein substantially in alignment with the aperture in the finger. The purpose of this enlarged aperture will be explained herebelow. The depending finger 72 and thumb 76 permit clamping to the runner rail 28 in the same manner as the heel joint nailing plate and clamping assemblies 30. Secured adjacent the margin of the frame is an upwardly extending channel member 78 which is drilled and tapped to receive a camber adjusting bolt 80 operable by a pivoted lever. Bolt 80 permits adjustable setting in a truss of camber, a desirable built-in upward bow in the lower chord member.

Typical toggle clamp structure as comprises the units 34 and 48 is shown in Figs. 9 through 11. The typical structure comprises a base plate B having upwardly extending stop means S at one end. Since the nature of the base plate and the stop may vary, they are represented in dotted lines in this typical representation of the clamp. Against the top of the base plate is secured a horizontal sleeve 82. Reciprocal within the sleeve is a tubular barrel 84 one end of which is drilled out and threaded to receive the clamping head 86. The clamping head comprises a threaded shaft having an enlarged head portion adapted to clamp the truss member T against the stop S. By the threaded engagement of the head 86 with the barrel 84, the gripping dimension of the clamp may be changed as desired. The rear end of the barrel is drilled transversely and has a floating link 88 pivoted thereto by a pin. An apertured lug 90 is secured in alignment with the barrel 84 to the base plate B, and pinned to the lug is a second link carrying an integral upwardly extending arm 94. The distal end of the link is apertured and is pivotally pinned to the free end of the floating link 88. Thus, when the arm 94 is urged upwardly, the floating link 88 withdraws the barrel from its extended position to a withdrawn position shown in Fig. 9. Conversely, a downward pressure on the arm will force the barrel to its extended position shown in Figs. 10 and 11.

In using the preferred form of the invention in fabrication of a hip roof truss the hip chord carriage 20 is employed. As stated, support means for the carriage comprise a pair of horizontally disposed arms 22 extending rearward from the top of the elongated bench 12 and resting at their rear ends on suitable legs. As shown in Fig. 5, an angle 96 is securely fastened along the top surface of each arm, and under the angle one top edge of each arm is undercut. The carriage 20 itself preferably comprises an elongated inverted shallow channel 98 as shown in Figs. 3 and 4. Secured across the bottom of the channel and slidable over the arms 22 are bearing plates 100 which carry part of the weight of the channel 98. Referring again to Fig. 5, a pivoted jaw 102 having fulcrum rib 104 running along one side thereof is held below each plate by a lever bolt 106. The bolt may be readily tightened to clamp the angle 96 between the jaw and the plate to fix the position of the carriage 20.

To produce a true roof truss it is important that the hip chord carriage 20 maintain a parallel relation with respect to the lower chord platform. This is automatically achieved in my present invention by a mechanism comprising a shaft 108 journaled in bearings 110 secured to the underside of the channel. The shaft 108 extends substantially the length of the channel. Referring to Figs. 1, 4 and 5, it will be noted that along the outside of each arm 22 are mounted gear racks 112. The opposite ends of the shaft 108 carry gear wheels 114 meshing with the racks 112 respectively. As the shaft is driven, the gear wheels continually mesh with the racks 112 whereby each end of the carriage 20 progresses at the same speed and a parallel relation with the platform 26 is maintained. Means for driving the shaft (see Fig. 3) comprise a crank 116 having a shaft 118 journaled in arms 120 which extend down from the channel. The shaft 118 mounts a worm gear 122 meshing with a pinion 124 rigidly carried by the shaft 108.

The top of the carriage 20 carries a plurality of nailing plate assemblies 126 similar to those shown in Figs. 13 through 17 and described above. In Fig. 18 parts of the assembly 126 corresponding to similar parts of the device of Figs. 13 through 17 are designated by the primed form of the same numeral. A difference in the structure from those devices is that to the side of the frame opposite the finger 72' are tacked depending ears 128. As shown in Fig. 18, the ears 128 engage one side of the channel 98 while the wing bolt 74' passing through the enlarged aperture in the thumb 76' engages the other side to clamp the assembly firmly in the desired place.

Secured to arms 130 (see Fig. 1) extending outward from the nailing plate assemblies on the carriage 20 are clamp assemblies similar to the typical clamp assembly described above. It is important that the clamp assemblies be provided at least at the corner joints of the truss to exert an inward force on the various chord and web members to provide a snug well-fitted joint.

In addition to the carriage clamping means 102—106 securing the position of the carriage 20 with respect to the arms 22 of the bench, central securing means are provided. These means comprise a slot 132 extending centrally along the top of the perpendicular off-shoot 14. Metal edging strips 134 overhung the lips of the slot. As shown in Fig. 1, the carriage 20 has a rearwardly extending horizontal plate 136. The plate rides along the edging strips 134 and has a central aperture, receiving a threaded bolt 138 operable by a lever on the head thereof. The threaded bolt engages an enlarged nut (not shown) below the slot to comprise a clamp engaging the edging strips 134 and fixing the position of the carriage 20 with respect to the perpendicular off-shoot.

In fabricating the hip-roof trusses requiring panel points along the sloping upper chord members, special nailing surfaces must be provided. In the preferred embodiment these comprise a pair of elongated heavy metal plates 140 pivotally mounted (see Fig. 6) on the rear of the elongated bench 12 and having their distal ends resting on the carriage 20 steadied between the side members of a fixable rectangular frame 142 secured to the carriage. It is a frame comprising downwardly extending legs 144 embracing the opposite flanges of the channel 98. A locking bolt extends through a tapped hole in one side of the frame. The pivoted mounting for the plate 140 preferably comprises a bracket 146 with an upstanding pivot bolt 148. Adjustable along each plate 140 is a sandwich clamp 150. Each sandwich clamp comprises a pair of strips 152, the upper one being an angle, both being secured in position on either side of the plate 140 by bolts. As shown in Fig. 1a, the sandwich clamp 150 is adapted for use as a stop to assure correct positioning of the sloping upper chord member and to prevent bowing thereof. Once the position of one of this chord member is established, the adjacent web is appropriately positioned and the panel point made as desired, using the pivoted plate 140 as the nailing plate.

The preferred embodiment of the clamp table as set up for fabrication of a triangular peaked roof truss is shown in Fig. 1b. In this use, the clamping and nailing plate assemblies 30 and 32 are positioned along the lower chord member platform 26 as in the formation of a hip roof truss. The carriage 20 provides support means for nailing plate assemblies 126 in the formation of the web-upper chord panel point, and the sandwich clamps 150 on the pivoted plates 140 are used to position and stabilize the sloping upper chord members.

Figure 24:
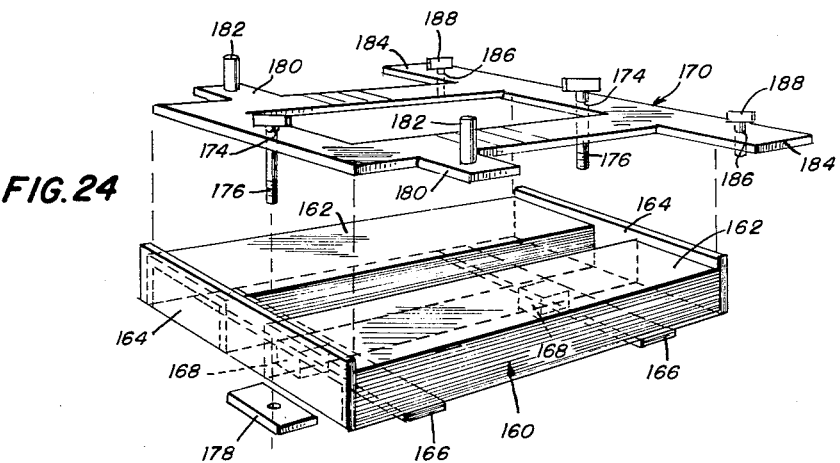
Fig. 24 is an exploded view of the adapter box for the peaked joint clamping and nailing plate assembly of the preferred embodiment of the invention shown in Fig. 1.

The peak joint nailing plate and clamping assembly 18 rests on the perpendicular offshoot 14 with the slot 132 used as positioning means. As shown in Figs. 7, 8 and 24, the assembly rests on a box-shaped structure 160 which raises the assembly sufficiently high to make it coplanar with the clamping and nailing plate assemblies of the platform 26. Preferably the box 160 may be made from two inverted channel members 162 having a space therebetween and joined at the opposite ends by a pair of metal strips 164. Secured to the bottom of the box are spaced additional reinforcing strips 166 which have central downwardly extending guide blocks 168 fitting into the slot 132. Superposing the box 160 and fitting between the metal strips 164 is the peak joint assembly frame 170 which is adapted to receive a thick rectangular nailing plate (not shown) and having apertures 174 in the forward and rear members thereof. The apertures receive wing bolts 176 which extend down through the space between the channel members 162, between the spaced edging strips 134 and engage enlarged nuts 178 (see Fig. 8) to comprise a clamping means by which the position of the assembly 18 is fixed. Intermediate the ends of the side members of the frame 170 are laterally extending portions 180. These latter portions have upstanding pivot pins 182 thereon. In addition, the rear member of the frame has laterally extending portions 184 formed with apertures 186 which are threaded to receive wing bolts 188.

Fig. 7 shows that the truss-member clamping means 200 for the peak joint assembly comprise toggle clamps as shown in Figs. 9 through 11. For simplicity, only one of the means is shown. Each includes a clamp secured to a thick metal base plate 202 which is apertured at one end thereof and has a sleeve 204 extending upwardly about the aperture. Extending off from one side of the baseplate 202 is a curved arm 206 having an arcuate slot 208 therein. In use, the aperture and sleeve 204 receive the pivot pin 182 and the wing bolt 188 extends through the slot 208 and threadedly engages the hole 186 in the frame 170. By this means the angled relation of the clamping means 200 can be fixed so that the clamping unit extends perpendicular to the upper chord member it engages. As shown in Fig. 1b the upper chord member lies between the sleeve 204 and the head of the clamping means 200. Web members may also comprise the peak joints.

To assist in positioning the various assemblies, the clamp table is graduated in various ways. To assure, for instance, the proper placement of the heel joint clamping and nailing plate assemblies 30, a tape 220 (see Fig. 1) extends from the center of the platform 26 outward to the ends. Thus the heel joint assemblies can be positioned coincident with the desired indication on the tape of the half length of the span. Running up the perpendicular offshoot 14 is a second tape 222 which indicates the height of the truss. It is useful is establishing the desired position for the carriage 20, the lower edge of the carriage being set over the tape indication of the height desired. This second tape also runs alongside the peak joint nailing the plate and clamping assembly 18, and by this means the latter can be appropriately positioned. For convenience, on a side member of the frame 170 (see Fig. 7) indicia representing trusses of various slopes is impressed to be registered with the desired height of the truss on the tape 222 to assure correct positioning of the assembly. By this means it is not necessary to run the tape up the center of the offsheet 14 where it would be obscured by the nailing plate in frame 170.

A modified form of the clamp table of the invention is shown in Figs. 19 through 23 and generally designated 10'. This embodiment is adapted for use in forming a triangular peaked roof truss only. It is primarily the same as the preferred embodiment with the omission of the hip chord carriage 20. In its place are fixed clamping and nailing plate assemblies 300 mounted on stationary wings 302 extending rearward from the bench.

The modification comprises a single-plane bench 12' and perpendicular offshoot 14' or arm. The surface is supported on sturdy legs 16' suitably cross braced as shown in Fig. 21. Its understructure comprises horizontally disposed beams 304 to which a plywood or similar working surface 306 is affixed. As with the preferred embodiment, the lower chord member, clamping and nailing plate assemblies 30' and 32' are clamped to a runner rail 28' disposed along the front edge of the elongated portion of the bench 12'. The offshoot 14' carries a peak joint assembly 18' lockable anywhere along slot 132' as in the preferred embodiment. These assemblies are supported directly on the table top rather than on a platform 26 or adapter box 160 as in the preferred embodiment. Fig. 23 shows how the frame 170' of the peak joint assembly 18' is clamped to the strips 132' by wing bolts 176' and nuts 178'.

By means of the clamp table of my invention, it is a simple matter to produce a series of identical, perfectly fitted trusses. Once the apparatus of the invention is set up, it takes practically no time at all to clamp the various truss members into proper position and to make the joints. Thanks to the movable hip chord carriage of the preferred embodiment and to the movable clamping and nailing plate assemblies, the table is suitable in the forming of trusses of virtually any size or dimension.

While this invention has been shown in but a limited number of forms, it is obvious to those skilled in the art that it is not so limited but is susceptible of various changes and modifications without departing from the spirit and scope of the claimed invention.

I claim:

1. A clamp table for holding, during assembly, the elements of a coplanar triangular roof truss, such elements including a lower chord member and a pair of upper chord members joined to such lower chord members respectively at heel joints and to each other at a peak joint, said table comprising an elongated bench, at least one heel joint clamping and support means adjustably supported on the top of said bench adjacent one end of said bench, said heel joint clamping and support means comprising a heel frame, a heel joint nailing plate abutting said heel frame and adapted to underlie a heel joint of such truss, heel stop means on the front of said heel frame, a heel clamp base plate pivotally connected to said heel frame, a heel clamp mounted on said base plate having a clamping head for movement generally toward and away from said heel stop means and adapted to clamp such heel joint against said heel stop means, means for fixing the position of said heel clamp base plate with respect to said heel frame, a horizontal, peak-joint arm extending rearward from the center of the bench, said peak joint arm including track means fixedly disposed substantially on the centerline of the peak joint arm, peak joint clamping and support means supported on said peak joint arm over said track means, means on said peak joint clamping and support means adapted to clampingly engage said track means to fix adjustably the position of said peak joint clamping and support means with respect to said track means, said peak joint clamping and support means comprising a peak joint frame adapted to receive a nailing plate to underlie the peak joint of such truss, a pair of peak clamp base plates, each peak clamp base plate formed with upstanding peak clamp stop members, vertically disposed peak clamp pivot means disposed on opposite sides of said peak joint frame respectively and pivotably connecting respectively said peak joint frame and said peak clamp base plates, upstanding peak clamp members mounted respectively on said peak clamp base plates and having clamping heads for movement toward and away from said peak clamp stop members respectively, means on each of said peak clamp base plates for fixing the position of said peak clamp members respectively with respect to said peak joint frame, whereby such upper chord members may be held respectively against said peak clamp stop members by said peak clamp members.

2. A clamp table for holding during assembly, the elements of a coplanar triangular roof truss, such elements including a lower chord member and a pair of upper chord members joined to such lower chord members respectively at heel joints and to each other at a peak joint, said table comprising an elongated bench, at least one heel joint clamping and support means adjustably supported on the top of said bench adjacent one end of said bench, said heel joint clamping and support means comprising a heel frame, a heel joint nailing plate abutting said heel frame and adapted to underlie a heel joint of such truss, said heel frame having a rearwardly extending heel arm, upstanding heel stop means on the front of said heel frame, a heel clamp base plate pivotally connected to said heel arm, a heel clamp mounted on said base plate having a clamping head for movement toward and away from said heel stop means and adapted to clamp such heel joint against said heel stops means, means for fixing the position of said heel clamp base plate with respect to said heel frame, a horizontal, peak-joint arm extending rearward from the center of the bench, said peak joint arm including track means fixedly disposed substantially on the centerline of the peak joint arm, peak joint clamping and support means supported on said peak joint arm over said track means, means on said peak joint clamping and support means adapted to clampingly engage said track means to fix adjustably the position of said peak joint clamping and support means with respect to said track means, said peak joint clamping and support means comprising a peak joint frame adapted to receive a nailing plate to underlie the peak joint of such truss, said peak joint frame having laterally extending portions with upstanding pivot pins mounted thereon, a pair of peak clamp base plates, each peak clamp base plate formed with an aperture and an upstanding sleeve about said aperture, said peak clamp base plates disposed with their apertures and sleeves receiving respectively said upstanding pivot pins, upstanding peak clamp members mounted respectively on said peak clamp base plates and having clamping heads for movement toward and away from said sleeves respectively, means on each of said peak clamp base plates for fixing the position of said peak clamp members respectively with respect to said peak joint frame whereby such upper chord members may be held respectively against said sleeves by said peak clamp members.

3. A clamp table for holding, during assembly, the elements of a coplanar triangular roof truss, such elements including a lower chord member and a pair of upper chord members joined to such lower chord members respectively at heel joints and to each other at a peak joint, said table comprising an elongated bench, a pair of heel joint clamping and support means adjustably supported on the top of said bench adjacent opposite ends of said bench respectively, each of said heel joint clamping and support means comprising a heel frame, a heel joint nailing plate abutting said heel frame and adapted to underlie a heel joint of such truss, said heel frame having a rearwardly extending heel arm, upstanding heel stop means on the front of said heel frame, a heel clamp base plate pivotally connected to said hub arm, a heel clamp mounted on said base plate having a clamping head for movement generally toward and away from said heel stop means and adapted to clamp such heel joint against said heel stop means, means for fixing the position of said heel clamp base plate with respect to said heel frame; a horizontal, peak-joint arm extending rearward from the center of the bench, said peak joint arm including track means fixedly disposed substantially on the centerline of the peak-joint arm, peak-joint clamping and support means supported on said peak joint arm over said track means, means on said peak-joint clamping and support means adapted to clampingly engage said track means to fix adjustably the position of said peak joint clamping and support means with respect to said track means, said peak joint clamping and support means comprising a peak joint frame adapted to receive a nailing plate to underlie the peak joint of such truss, said peak joint frame having laterally extending portions with upstanding pivot pins mounted thereon, a pair of peak clamp base plates, each peak clamp base plate formed with an aperture and an upstanding sleeve about said aperture, said peak clamp base plates disposed with their apertures and sleeves receiving respectively said upstanding pivot pins, upstanding peak clamp members mounted respectively on said peak clamp base plates and having clamping heads for movement toward and away from said sleeves respectively, means on each of said peak clamp base plates for fixing the position of said peak clamp members respectively with respect to said peak joint frame, whereby such upper chord members may be held respectively against said sleeves by said peak clamp members.

References Cited in the file of this patent

UNITED STATES PATENTS

| | | |
|---|---|---|
| 2,209,379 | Bell | July 30, 1940 |
| 2,305,124 | Wilson et al. | Dec. 15, 1942 |
| 2,311,536 | Goodman | Feb. 16, 1943 |
| 2,544,499 | Hovey | Mar. 6, 1951 |
| 2,574,281 | Olson | Nov. 6, 1951 |
| 2,623,560 | Joseph | Dec. 30, 1952 |

FOREIGN PATENTS

| | | |
|---|---|---|
| 159,875 | Australia | Aug. 14, 1952 |